Dec. 12, 1967   U. OBERRECHT   3,357,609
APPARATUS FOR EVERTING POCKET-LIKE WORKPIECES
Filed Jan. 12, 1966   4 Sheets-Sheet 1
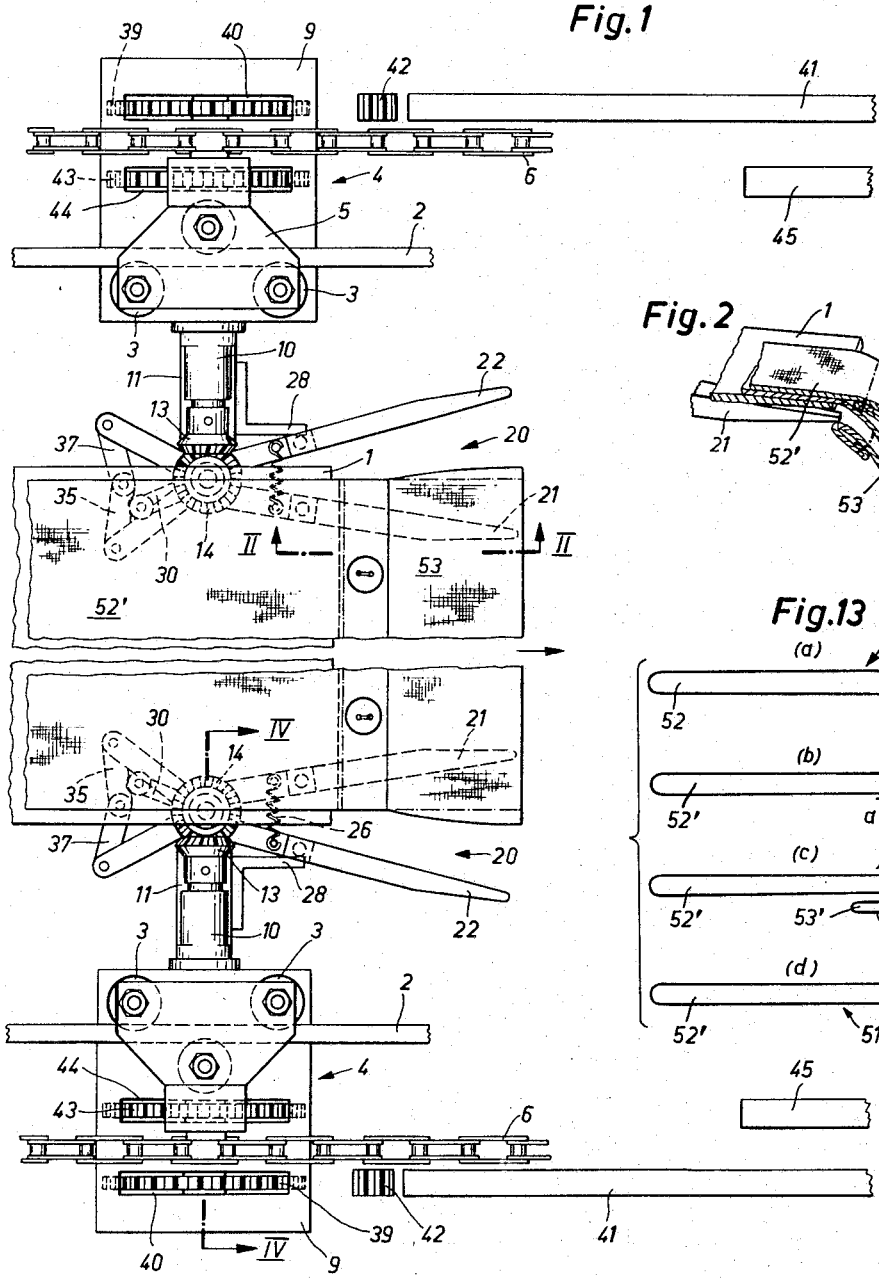
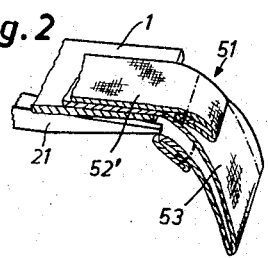
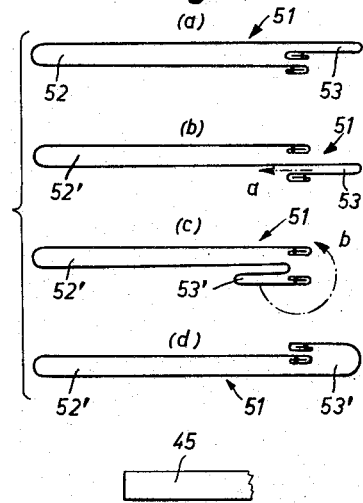
INVENTOR.
ULRICH OBERRECHT
BY KARL RATH
ATTORNEY Dec. 12, 1967          U. OBERRECHT          3,357,609
APPARATUS FOR EVERTING POCKET-LIKE WORKPIECES
Filed Jan. 12, 1966                    4 Sheets-Sheet 2

INVENTOR.
ULRICH OBERRECHT
BY
KARL RATH
ATTORNEY

Dec. 12, 1967     U. OBERRECHT     3,357,609
APPARATUS FOR EVERTING POCKET-LIKE WORKPIECES
Filed Jan. 12, 1966     4 Sheets-Sheet 3
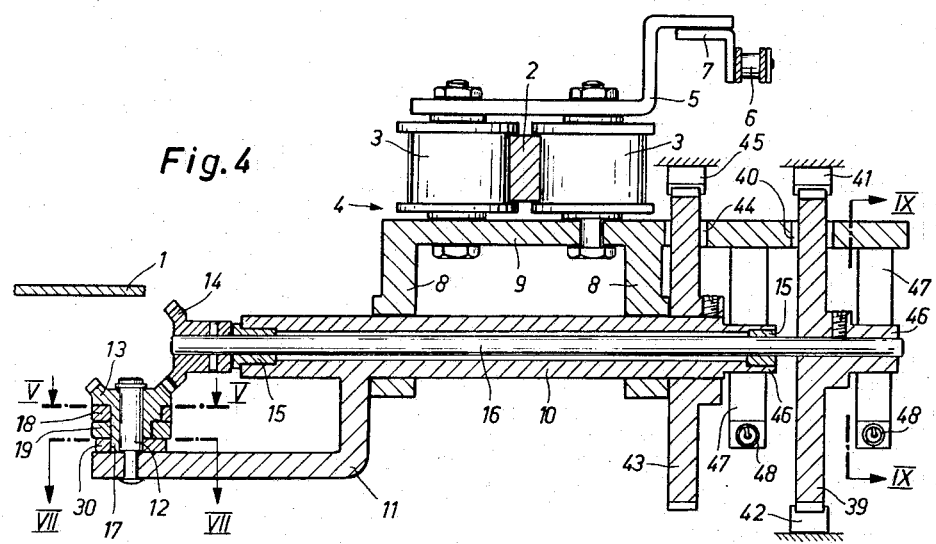
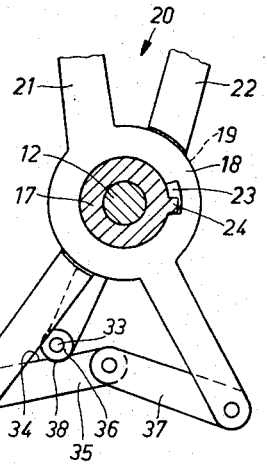
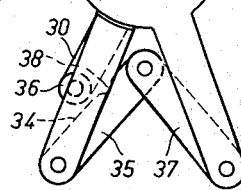
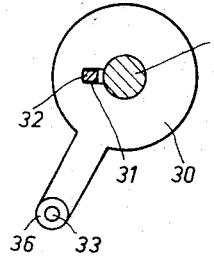
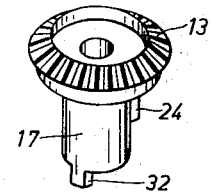
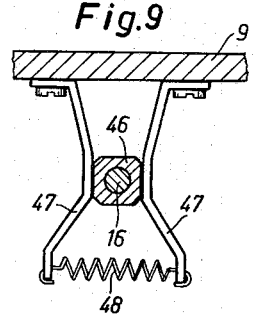
INVENTOR.
ULRICH OBERRECHT
BY KARL RATH
ATTORNEY Dec. 12, 1967  U. OBERRECHT  3,357,609
APPARATUS FOR EVERTING POCKET-LIKE WORKPIECES
Filed Jan. 12, 1966  4 Sheets-Sheet 4
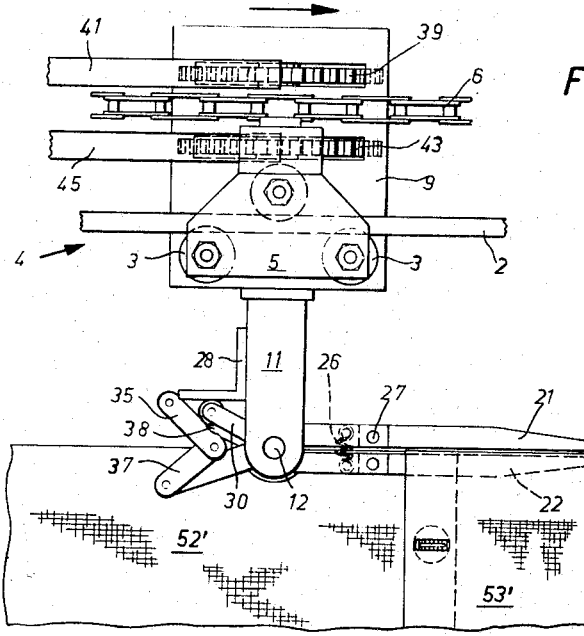
Fig. 11
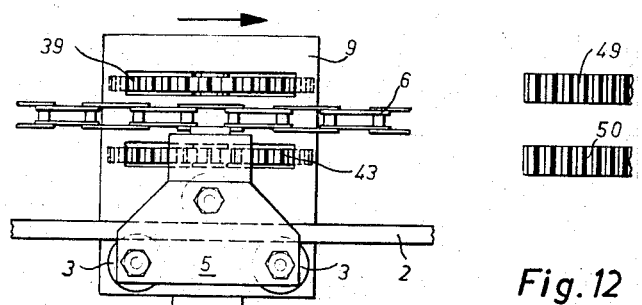
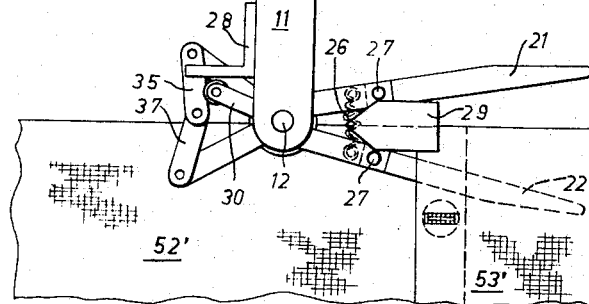
Fig. 12
INVENTOR.
ULRICH OBERRECHT
BY
KARL RATH
ATTORNEY

United States Patent Office 3,357,609
Patented Dec. 12, 1967

3,357,609
APPARATUS FOR EVERTING POCKET-LIKE WORKPIECES
Ulrich Oberrecht, Niedermendig, Rhineland-Pfalz, Germany, assignor to G. M. Pfaff A.G., Kaiserslautern, Pfalz, Germany, a corporation of Germany
Filed Jan. 12, 1966, Ser. No. 520,197
Claims priority, application Germany, Jan. 11, 1965, P 35,846
12 Claims. (Cl. 223—39)

ABSTRACT OF THE DISCLOSURE

Everting or inside turning out of pocket-like workpieces, such as pillow cases, is effected by means of two pairs of everting tongs disposed in a common plane with their tongs maintained in normally spread position against the action of return springs. Both pairs of tongs, facing the opening of the workpiece to be everted in the starting position, are spaced at a distance conforming to the width of the workpiece and fitted with actuating mechanism supported by a pair of movable carriers operable in a forward and return stroke along paths parallel to the sides of the workpiece in the starting position. The operating mechanisms of each pair of tongs include means for both rotating the tongs of each pair relative to one another to spread and close the same, as well as to rotate the tongs of each pair in unison, further means being provided to control said mechanism in response to the operating positions of said carriers, in such a manner as to effect, during the forward stroke of said carriers, the consecutive operations of first introducing the spread pairs of tongs into the opening of the workpiece, thereafter releasing and closing the tongs of each pair by the action of their return springs, to grip the insides and outsides of the lateral edges of the workpiece, and finally rotating in unison and through angles of 180° each pair of tongs together with the workpiece gripped thereby in opposite directions and towards the inside of the workpiece, to thereby evert the latter. If desired, the everted workpiece may then be operated to a discharge or the like position by additional control mechanism also controlled by the movement of said carriers and rotating each pair of tongs in unison and in a direction at right angle to the planes of the tongs. The tongs, upon operation in the reverse direction during the return stroke of said carriers, are returned to their starting positions for the commencement of another everting cycle.

---

The present invention relates to apparatus for the turning inside out or everting of pocket-like articles or workpieces, such as pillow slips or cases, cushion covers and the like, more particularly, though not limitatively, to devices of the type comprising two pockets, such as a larger pocket and a small pocket obtained by reversely bending the opposite end portions of a cut or sheet and joining the overlying lateral edges of the bent over portions by a stitching seam or the like connection. In the fabrication of devices of this type, it is customary to turn the pockets inside out, to conceal the seams and to improve the appearance of the devices.

It is already known in the sewing of bed pillow cases, or the like articles, to provide automatic everting apparatus following the sewing apparatus proper for producing the side stitches or seams of the articles, said everting apparatus serving to turn the articles inside out, to conceal the seams thereof in a manner well known. For this purpose, the sewn articles or workpieces are fed to the everting station by the aid of suitable conveyer or feeding means with the small pocket of a two-pocket workpiece overlying the large pocket of the device. In order to first evert the small pocket of the workpiece, in accordance with operation of the known devices, it is necessary to arrest the conveyer and to lift the upper part of the small pocket to a certain extent, such as by means of a pneumatic suction device, whereupon everting is effected in a two-step operation by introducing a first everting tool or element having two spaced and parallel fingers into the pocket from its open side so as to cause said fingers to adjoin the inside of the lateral seams of the pocket, and subsequently moving a second everting tool or element from the opposite side against the outside of the bottom edge or fold of the pocket and between said fingers of the first everting element. As a consequence, the second everting element in entering the pocket causes the sides of the latter to be forced over the edges of said fingers, in such a manner as to reverse or turn the pocket inside out.

In the case of a two-pocket workpiece, the thus everted small pocket will be positioned, upon retraction of the everting tools, upon the still unreversed large pocket. After the small pocket has been everted in the manner described, the conveyor may be restarted, to feed the workpiece to the next operating station for the eversion of the large pocket by a similar mechanism and process as described. Inasmuch as during the everting of the large pocket its opening will be transferred from an assumed initial position upon the upper side of the workpiece to the underside thereof, and since, furthermore, the small pocket upon eversion in the manner described overlies the opening of the large pocket, it is necessary, in the operation of the known reversing devices, to transfer the everted small pocket to the underside of the workpiece, such as by the provision of suitable guide or abutment means engaged by the small pocket during the feeding movement to the next everting station, to thereby ensure the workpiece to leave the everting apparatus in the proper relative position of both pockets in the everted position.

Everting apparatus of the foregoing type is both bulky and costly and subject to the further drawback that the workpiece must be arrested during the everting operations, whereby to substantially increase the operating time and to reduce the efficiency of the apparatus. Besides, since with the known arrangement the small pocket must be lifted to facilitate the entry of the everting tool or element, arrangements of the referred to type are practically limited in their use to automatic sewing apparatus where the work is applied or fed with the opening of the pockets upon the upper side of the workpiece, a requirement normally to be met only in connection with the fabrication of relatively simple and low-cost articles, in particular linen pillows or the like devices. On the other hand, in the manufacture of high-grade pillow cases or the like articles, in particular articles provided with embroidering or decorative patterns, or designs, it is often necessary or desirable to feed the workpieces with the openings of the pockets upon the underside in the interest of enabling a proper positioning of the devices and to prevent damage thereto during the feeding operations.

Accordingly, among the objects of the present invention is the provision of novel and improved everting apparatus of the referred to type, for the turning inside out of pocket-like workpieces, by which the foregoing and related drawbacks and shortcomings of the previously known everting devices are substantially overcome or minimized; which apparatus will effect the complete reversal of a workpiece by a single step or operation; which operates during the feeding or passage of the workpiece through the processing station, or without arresting the workpieces during the everting operation; which will enable the workpieces to be fed with the openings of the pocket or pockets positioned upon the underside thereof; and which apparatus is both simple and compact in design and construction, as well as expeditious and efficient in operation.

The invention, both as to the foregoing and ancillary objects, as well as novel aspects thereof, will be better understood from the following detailed description, taken in conjunction with the accompanying drawings forming part of this specification and in which:

FIG. 1 is a plan view of a pillow case everting device, suitable for use in connection with automatic sewing apparatus and constructed in accordance with the principles of the invention;

FIG. 2 is a partial perspective view, taken on line II—II of FIG. 1, of a workpiece to be everted in the starting position prior to the insertion of the everting tongs forming part of FIG. 1;

FIG. 4 is a sectional view taken on line IV—IV of FIG. 1;

FIG. 5 is a partial plan view, taken on line V—V of FIG. 4, of a pair of everting tongs in the starting or spread position;

FIG. 6 is a view similar of FIG. 5, showing the everting tongs in the closed or operative position;

FIG. 7 is a sectional view taken on line VII—VII of FIG. 4;

FIG. 8 is a partial perspective view of the bevel gear rotating the tongs according to the preceding figures;

FIG. 9 is a sectional view taken on line IX—IX of FIG. 4;

FIG. 11 is a view similar to FIG. 10, showing the position upon rotation of the everted workpiece to its initial position;

FIG. 12 is a further view similar to FIG. 11, showing the everting tongs in the spread position at the end of an everting operation and prior to the return to starting position according to FIG. 1; and FIG. 13 illustrates by a number of schematic diagrams the consecutive steps of everting a two-pocket workpiece by means of apparatus shown by the preceding figures.

Like reference numerals denote like parts and elements throughout the different views of the drawings.

Figure 3:
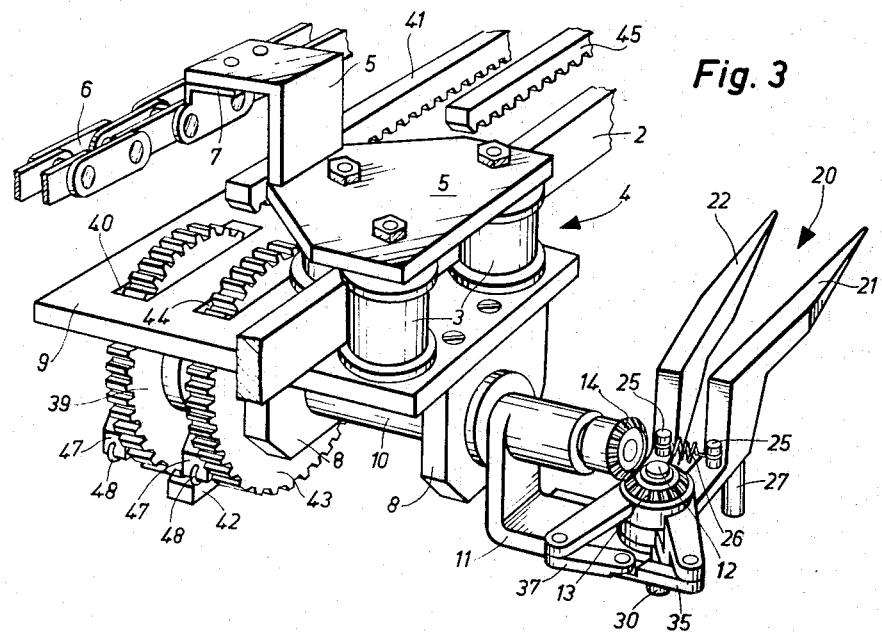
FIG. 3 is a further partial perspective view, more clearly showing a pair of everting tongs and their operating mechanism.

With the foregoing objects in view, the invention, according to one of its aspects, involves generally the provision of a pair of movable supports operable along equal and parallel paths between a starting and an end position, such as in the form of a pair of slides operated by synchronously operated driving chains or the like driving means. The everting tools proper comprise a pair of everting tongs rotatively mounted upon each of said supports with resilient means being provided to normally urge each pair of tongs to their closed position. The tongs are further provided with means to spread and lock the same at a predetermined spreading angle in the starting position of the device. Suitable feeding and positioning means serve to position the workpieces to be everted with their open sides disposed opposite to the tongs in the starting position of the everting elements or supports. Each of the latter carries identical operating mechanism with means to control the same by the displacement of the supports from said starting to said end position, in such a manner as to effect the consecutive operations, in the order named, of introducing the spread pairs of tongs into the workpiece with one tongs arm of each pair positioned inside and with the other tongs arm of each pair positioned outside of the workpiece, releasing and closing the tongs of each pair by said resilient means so as to grip the insides and outsides of the lateral edges or seams of the workpiece, and finally rotating, in unison and through an angle of 180°, each of the closed tongs together with the workpiece gripped thereby in opposite directions toward the inside of and substantially within the plane of the tongs, to thereby evert the same by a single (rotating) operation, in a manner as will become more apparent as the description proceeds.

According to a simple embodiment of the invention, closing and rotation of the everting tongs is effected by means of a pair of stationary racks disposed parallel to the operating paths of the slides or supports, said tracks adapted to cooperate with driving gears upon said supports operably connected with the associated pairs of everting tongs through suitable motion-transmitting or coupling means.

In everting the small pocket of a two-pocket workpiece, it is possible by use of the present invention to feed the workpieces with the openings of both pockets upon the underside of the workpiece, and preferably with the large pocket being everted before the eversion of the smaller pocket by the everting apparatus of the invention. In such a case, the everted small pocket will be positioned underneath the large pocket and, in order to discharge the workpiece in the proper relative position of the pockets by the everting station, the tongs gripping the workpiece in the everted position may be additionally rotated about an axis at right angle to the axis of the first rotation, to return the small pocket to a position in line with the large pocket. The latter rotation is advantageously effected by means of a pair of further stationary racks cooperating with further driving gears mounted upon said supports, with said first coupling means including a pair of bevel gears, to enable rotation of the tongs about different axes, these and other details and improved features of the invention becoming more apparent as the following description proceeds in reference to the drawings.

Referring more particularly to FIG. 1, there is shown apparatus for the everting of the small pocket 53, FIG. 13, of a two-pocket pillow case 51 or the like article including a larger pocket 52, said pockets being formed in a known manner by reversely bending the end portions of a fabric or the like sheet or cut and stitching or otherwise connecting the overlapping lateral edges of the folds or pockets formed. In the example shown, it is assumed that the workpiece 51 is fed with the pockets pointing downward, FIG. 13a, and with the large pocket 52 having already been previously been everted by known means, as indicated at 52', FIG. 13b, the mechanism shown, serving to reverse the small pocket 53 of the workpiece, such as a pillow case, by a series of automatic steps or operations as described in the following.

More particularly, the workpiece 51 fed by any suitable feeding means (not shown) is positioned upon a support or table 1, FIGS. 1 and 2, with the smaller pocket 53 overhanging the edge of the table and with the larger and already everted pocket 52' positioned upon said table, in the manner shown by the drawing.

Disposed laterally of and parallel to each of the side edges of the table 1 are a pair of guide rails 2 extending from the reversing station or mechanism to a point near the discharge or output station of the device, said rails serving as guides for a pair of slides 4 each fitted, in the example shown, with three guide rollers 3 engaging the opposite sides of the associated rails and serving as supports for a pair of everting devices or mechanisms to be described presently. The slides 4 are each rigidly connected to an endless chain 6 moving parallel to the rails 2 by the top plates 5 of the slides being affixed to the associated chain through a pair of connecting links or brackets 7, FIG. 3. The chains 6 are passed in a known manner over a pair of chain wheels or sprockets one of which may be driven by an electric motor (not shown).

While in the following, reference will be made to a single everting device and its associated operating mechanism, it is understood that the same description applies to the other everting device, the complete apparatus comprising identical devices for the everting or turning inside out of both the lateral edges of the workpiece, in a manner as will become further apparent as the description proceeds.

Journalled in a pair of supports or brackets 8 depending from the base plates 9 of the slides 4, FIGS. 3 and 4, is a first hollow shaft 10 the left hand end of which, as seen in FIG. 4, terminates in a depending supporting arm or bracket 11 to which is affixed a vertical pivot pin 12. Freely rotatively mounted upon the pin 12 is a first bevel gear 13 meshing with a second bevel gear 14 having a like number of teeth as the gear 13 and being secured to the end of a further shaft 16 rotatively supported within the shaft 10 by a pair of supporting sleeves 15. The bevel gear 13 mounted upon the pin 12 has a depending cylindrical extension or sleeve 17, FIG. 8, which in turn serves to rotatively support the two hubs 18 and 19 of the arms 21, 22 of a pair of everting tongs devices 20. The hub 18 of the tongs arm 21 has a concentric arcuate groove 23, FIGS. 5 and 6, with which engages a nose or radial projection 24 of the sleeve 17 of the gear 13. The width of the groove 23 exceeds the width of the nose 24, to provide a lost-motion connection between gear 13 and the tongs arm 21 the function and purpose of which will be further understood as the description proceeds.

Both arms or legs 21, 22 of the tongs 20 are bent angularly upwardly as shown in FIG. 3 and each fitted with an upstanding pin 25 adjacent to the hubs 18, 19, said pins being connected through a tension spring 26 tending to urge the arms 21, 22 to their closed position, FIG. 6. Besides, the tongs arms 21, 22 are each fitted upon their lower sides, FIG. 3, with a further depending pin 27 which cooperates with an angular abutment 28, FIGS. 1 and 10, secured to the bracket 11, in the closing of the tongs, the opening thereof being effected by the pins 27 being engaged by a wedge-shaped stationary spreading member 29, FIG. 12, disposed in the path of the slides 4 at a point close to the discharge or end position of the forward operating stroke of the device, in the manner as will become further apparent from the description of the operation of the device.

In order to fix the everting tongs in the open (spread) and closed positions, respectively, there is provided underneath the hubs 18, 19, FIGS. 4 and 7, and in rotative engagement with the pin 12, a lever 30 adjoining the bracket arm 11, the pivot bore of said lever having a groove 31 which is engaged by a further depending nose or axial projection 32 of the sleeve 17 of the gear 13, whereby to operatively connect the lever 30 with the bevel gear 13. Secured to the free end of the lever 30 is an upstanding pin 33 which carries a rotatable roller 36 engaging the edge 34, FIGS. 5 and 6, of a lever arm 35 forming part of a toggle-joint linkage mechanism connecting the opposite ends of the tongs arms 21, 22 and comprising a further lever arm 37, lever arms 35 and 37 being jointed to one another, on the one hand, and to the ends of tongs arms 21, 22, on the other hand, in the manner shown and readily understood. In order to lock the arms 21, 22 in the spread position, FIG. 6, the edge 34 of lever arm 35 is formed with an arcuate recess 38 adapted to be engaged by the roller 36 in the spread or open position of the tongs.

In order to effect rotation of the tongs arm 21 in the horizontal plane, or plane defined by the tongs, that is, about a vertical axis (pivot 12), the shaft 16, FIG. 4, has affixed to its opposite (rear) end a gear 39 extending through a recess 40 in the base plate 9 of the slide 4 and adapted to mesh with a stationary rack 41 of relatively great length and disposed above the gear 39. Further disposed below the gear 39 and slightly ahead of the rack 41 is a further relatively short rack 42, practically having from a single to about two teeth and also adapted to cooperate with the gear 39, to impart to it a slight rotational movement during the forward displacement of the slide 4 by the chain 6. As will be understood, rotation of gear 39 by the rack 42 will be in the opposite direction to its rotation by the rack 41.

Disposed laterally of and parallel to the gear 39 is a further driving gear 43 having an equal number of teeth to the gear 39, gear 43 extending through a further recess 44 in the base plate 9 and adapted to mesh with a further stationary rack 45 overlapping and arranged parallel to the rack 41. The rack 45, which serves to rotate the tongs 20 in a vertical plane, or about a horizontal axis, is arranged with its starting point lagging the starting point of the rack 41, in respect to the direction of movement of the slide 4, as indicated by the arrow in FIG. 1, to an extent corresponding approximately to one half of the circumference of the gears 39 and 43, while both racks 41 and 45 terminate at the same point.

In order to fix the position of the everting tongs in both the horizontal and vertical planes, both the shaft 10 carrying the gear 43 and the gear 39 are fitted with square heads 46, FIGS. 4 and 9, the vertical sides of which are engaged by a pair of depending retaining arms or brackets 47 mounted upon the underside of the base plate of the slide 4, the free ends of said arms being connected through a tension spring 48, to maintain a resilient contact engagement between the arms 47 and heads 46.

In order to facilitate the removal or discharge of the everted workpieces, two further short stationary racks 49 and 50, FIG. 12, are disposed below and for cooperation with the gears 39, 43 at a position close to the final operating position of the slides 4, the length of the racks 49, 50 being such as to impart a slight downward rotation of about 20° to the points of the tongs arms 21, 22.

The operation of the everting apparatus shown and described in the foregoing is as follows.

Let it be assumed that the workpiece 51 is fed and positioned upon the table 1 in the manner shown in FIGS. 1 and 2, that is, with the small pocket 53 depending from the edge of the table and with the everting tongs 20 positioned with their tongs arms opposite the open end of the workpiece. If now the two slides 4 are displaced in the operating direction, as indicated by the arrow in FIG. 1, by the chains 6 driven synchronously with one another, the spread arms 21 of the tongs of each pair enter the pocket 53, thus stretching it in a substantially horizontal position. During continued movement of the slides 4, the gears 39 first engage the short racks 42 so as to be subjected to a slight rotation in a first direction, said rotation being transmitted, via shaft 16, to the bevel gears 13, 14. As a consequence, rotary motion is imparted, by way of the projections 32, to the detent levers 30 connected with the gears 13, whereby the rollers 36 become disengaged from the recesses 38 of and slide along the sides 34 of the lever arms 35. Inasmuch as, in the spread position of the tongs, the projections 24 of the bevel gear sleeves 17 engage the side of the grooves 23 opposite to the tongs arms 21, FIG. 5 and since, furthermore, the pins 27 of each of the tongs arms engage the associated abutment 28, both tongs arms 21 at first are subjected to a slight outward rotation in the direction towards the side edges of the workpiece 53. As a consequence, the springs 26 are released by the rotation of the tongs, whereby to close the tongs arms 21, 22 and to firmly clamp or grip the insides and the outsides of the lateral edges or seams of the workpiece. At the same time, the workpiece is spread and tensioned by the closing movements of the tongs.

Figure 10:
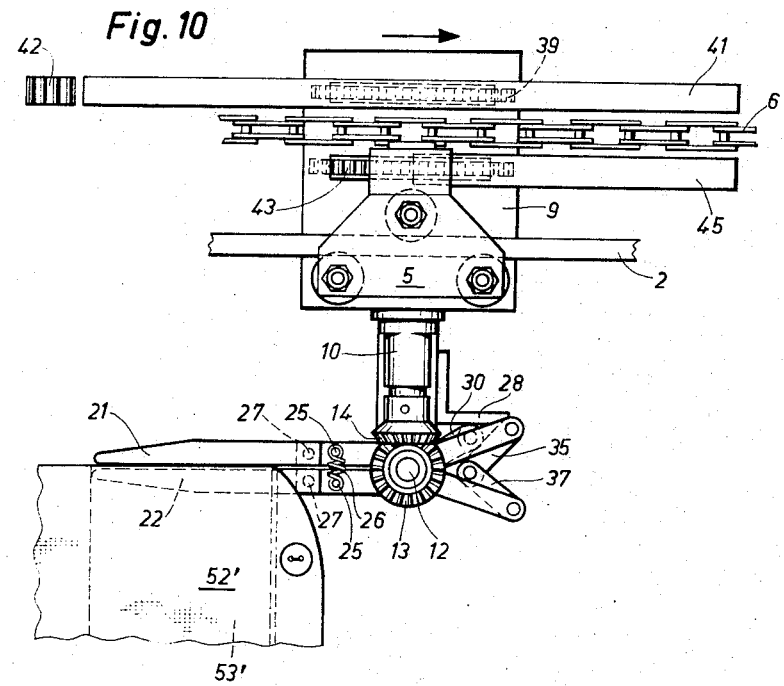
FIG. 10 is a partial view of FIG. 1, showing a pair of everting tongs and the workpiece at the end of an everting operation.

After the gears 39 have become disengaged from the short racks 42, they engage, during continued displacement of the slides 4, the racks 41, whereby to impart thereto a rotary motion over about 180° in a direction opposite to the rotation imparted by the racks 42. Inasmuch as the projections 24 of the bevel gears 13, FIG. 6, now engage the opposite sides of the grooves 23 of the hubs 18, rotation of the gears by the racks 41 is imparted to both tongs arms 21, 22, whereby both pairs of tongs gripping the workpiece are rotated in a horizontal plane, that is, within the plane of the tongs towards the center of the workpiece and about the pins 12 as a pivot. Since, furthermore, the two tongs arms are thus operated from the outside of and into the workpiece or pocket 53 and, since at the same time, the tongs arms 21 move from the inside towards the opening of the pocket, the latter is everted or turned inside out, as shown in FIGS. 10 and 13c representing the end position of the everting operation with the arms 21, 22 still held in the closed position by the springs 26, to maintain their grip on the everted workpiece or pocket.

During the continued displacement of the slides 4, the gears 43 engage the associated racks 45, whereby to rotate both gears 39 and 43 in the same direction and at the same peripheral speed due to the equality of the number of teeth of said gears. As a consequence, rotation of about 180° is imparted to both shafts 10 and 16, whereby to in turn rotate each pair of tongs 20 by way of the brackets 11 about a horizontal axis, FIG. 13c, in such a manner as to assume a position, at the end of the rotational movement, as shown in FIG. 11. The small and everted pocket has thus been returned to a position in line with the large pocket, as indicated in FIG. 11, wherein the end portion of pocket 53 shown fitted with button holes overlies the end portion of pocket 52 provided with corresponding buttons in the drawing (see FIG. 10).

Since, as pointed out, the peripheral speeds of the gears 39, 43 are alike and since, furthermore, the number of teeth of the bevel gear 13 equals the number of teeth of the bevel gear 14, no relative motion occurs between the bevel gears 13, 14, whereby to result in rotation of both tongs arms 21, 22 about the shaft 10 in a vertical plane without additional rotation or reaction resulting from the rotation of the gears 13 and 14.

After both gear pairs 39 and 43 have reached the ends of the racks 41, 45, FIG. 11, both tongs 20 are arrested by virtue of both pairs of brackets 27 being maintained in contact with the lateral faces of the heads 46 by the action of the springs 48. In this position, the workpiece may be fed to the discharge or next following processing station.

Shortly before arriving at the final or discharge position, the pins 27, extending from the now upper side of the tongs, as a result of the rotation of the tongs about a horizontal axis, are engaged by the spreading member 29, whereby to open or spread the tongs arms of each pair of tongs 20, as shown in FIG. 12. As a result of the spreading movement of the tongs, the roller 36 of each lever 30 again engages its associated recess 38 of the levers 35, thus arresting and locking the tongs in their spread position in which position they are further subjected to a slight downward deflection, to facilitate removal or discharge, by the gears 39, 43 engaging the racks 49, 50, FIG. 12.

After both slides 4 have reached the final (discharge) position during the forward operating stroke of the device, in the manner described hereinbefore, the direction of movement of the chains 6 is reversed, such as by revrsing the direction of rotation of the driving motor by a control cam or the like (not shown). As a consequence, the slides 4 are returned to the starting position, FIG. 1. At the beginning of the return movement, the everted pocket 52 is discharged from the tongs 20 which latter are returned to their initial position, FIG. 1, by engagement of the gears 39, 43 with the racks 49, 50, 41, 45 and 42 in the reverse direction, the final starting position being again fixed by the vertical sides of the heads 46 being engaged by the brackets 47, in the manner described and understood from the foregoing.

While in the foregoing the invention has been described in reference to the eversion of the small pocket of a two-pocket pillow case or the like workpiece, it is to be understood that the improved everting apparatus of the invention may also be used for the everting of single pocket devices such as bags, pouches, or the like articles, there being required merely the provision of suitable feeding and positioning means for the placing of the articles in the proper starting position in respect to the reversing tongs or apparatus.

In the foregoing the invention has been described with reference to a specific illustrative device or apparatus. It will be evident, however, that variations and modifications, as well as the substitution of equivalent parts or elements, for those shown herein, may be made without departing from the broader scope and spirit of the invention as set forth in the appended claims. The specification and drawings are accordingly to be regarded in an illustrative rather than in a restrictive sense.

I claim:

1. Apparatus for everting pocket-like workpieces having a closed bottom, an open side opposite thereto, and a pair of lateral edges joined by a connecting seam, said apparatus comprising in combination:
   (1) a pair of movable supports operable along equal parallel paths between a starting and an end position,
   (2) a pair of everting tongs pivotally mounted upon each of said supports, both said pairs of tongs coinciding with a common plane,
   (3) resilient means to urge each pair of tongs to their closed position,
   (4) further means to spread and lock each pair of tongs at a pre-determined spreading angle,
   (5) means to position a workpiece to be everted with its open side disposed opposite to said tongs in the starting position of said supports,
   (6) operating mechanism for said tongs upon each of said supports, and
   (7) means to control said mechanisms in response to the movement of said supports, to effect, during the displacement of said supports from said starting position to said end position, the consecutive operations in the order named of introducing the spread pairs of tongs into said workpiece, releasing and closing the tongs of each pair by said resilient means so as to grip the insides and outsides of the lateral edges of said workpiece, and rotating in unison and through an angle of 180° each pair of closed tongs together with the workpiece gripped thereby in opposite directions towards the inside of the workpiece and within the plane of the tongs, to thereby evert the workpiece gripped by said tongs.

2. In everting apparatus as claimed in claim 1, said operating mechanism including a pair of stationary racks disposed parallel to said paths, a driving gear carried by each of said supports for cooperation with one of said racks, and motion-transmitting means operably connecting each of said gears with the associated pairs of reversing tongs.

3. In everting apparatus as claimed in claim 1, said operating mechanism including a driving gear mounted upon each of said supports, a pair of first stationary racks of relatively short length each disposed parallel to said paths on one side of and for cooperation with one of said gears, motion-transmitting means operably connecting each of said gears with the associated pairs of tongs, and a further pair of stationary racks of relatively greater length in line with and spaced, in the direction of movement of said supports, from said first racks, said further racks disposed upon the opposite side of and adapted to cooperate with said gears, whereby rotation of said pairs of tongs in one direction, during engagement of said gears with said first racks, causes the release of the tongs and gripping of the workpiece thereby, and subsequent rotation of the pairs of tongs in the opposite direction, during engagement of said gears with said further racks, causes rotation of said pairs of tongs in unison, to reverse the workpiece gripped by said tongs.

4. In everting apparatus as claimed in claim 3, including lost-motion coupling means inserted in said motion-transmitting means, to allow of both relative spreading and closing of the tongs of each pair, as well as of common rotation thereof by said gears, respectively.

5. In everting apparatus as claimed in claim 1, said operating mechanism including a shaft journalled in each of said supports, a driving gear at one end of each said shafts, a pair of stationary racks disposed parallel to said paths and each in operative relation to one of said gears, and a pair of bevel gears coupling said shaft with one leg of the associated tongs through a lost-motion connection, to allow of relative spreading of the tongs of each pair and of rotation of both legs of the tongs in unison by said gears, respectively.

6. In everting apparatus as claimed in claim 1, said operating mechanism including further means also controlled by the movement of said supports and operative subsequently to rotation of the pairs of tongs within the plane of the workpiece, to rotate each pair of tongs about an axis at right angle to the axis of the first rotation.

7. In everting apparatus as claimed in claim 6, said operating mechanism including a first hollow shaft journalled in each said supports, first driving gears, mounted upon said shafts, first stationary racks parallel to said paths for cooperation with one of said gears, a carrier fast upon said shafts and pivotally supporting the associated pairs of tongs, whereby to effect rotation of both pairs of tongs in unison by said first gears, a second shaft journalled within each of said first shaft, a second driving gear upon one and of each of said second shafts, a second stationary rack parallel to said paths for cooperation with each of said second gears, and a pair of bevel gears connecting the opposite end of each of said second shaft with one leg of the respective pair of tongs through a lost-motion coupling connection.

8. In everting apparatus as claimed in claim 7, both pairs of said first and second gears and of said bevel gears having equal numbers of teeth, and said first rack having a length about one half of the length of said second rack and overlapping the second half-portion of said second rack in respect the moving direction of said supports.

9. In everting apparatus as claimed in claim 7, both pairs of said first and second gears and of said bevel gears having equal numbers of teeth, said first rack having a length about one half of the length of said second rack and overlapping the second half-portion of said second rack, in respect to the direction of movement of said supports, and a third rack of relatively short length preceding each of said second racks and disposed upon the opposite side of said second driving gears, to briefly rotate the tongs of each pair in the unlocking direction prior to their combined rotation in the closed position.

10. In everting apparatus as claimed in claim 7, including further stationary rack means in operative relation to the said first driving gears, to slightly deflect each pair of tongs in the downward direction prior to their arrival at the end position of the operating path of said supports.

11. In everting apparatus as claimed in claim 1, said workpiece being of the two-pocket type and positioned in said starting position with the opening of the pocket to be everted located upon the underside of the remaining pocket.

12. In everting apparatus as claimed in claim 1, said workpiece being of the two-pocket type having a pair of large and small pockets normally disposed with their openings adjoining one another upon one side thereof, said workpiece positioned in said starting position with the opening of its small pocket to be everted located upon the underside and with the opening of its large pocket in everted condition located upon the upper side of the workpiece.

References Cited

UNITED STATES PATENTS 2,410,731    11/1946    Hannewald et al. _____ 233—39
2,520,200    8/1950    Ersted _____ 233—39

FOREIGN PATENTS 1,044,770    8/1964    Great Britain.

PATRICK D. LAWSON, *Primary Examiner.*

G. V. LARKIN, *Assistant Examiner.*